No. 727,525. PATENTED MAY 5, 1903.
R. WINGREN.
ELECTRIC BATTERY FOR BODY WEAR.
APPLICATION FILED FEB. 16, 1903.
NO MODEL.
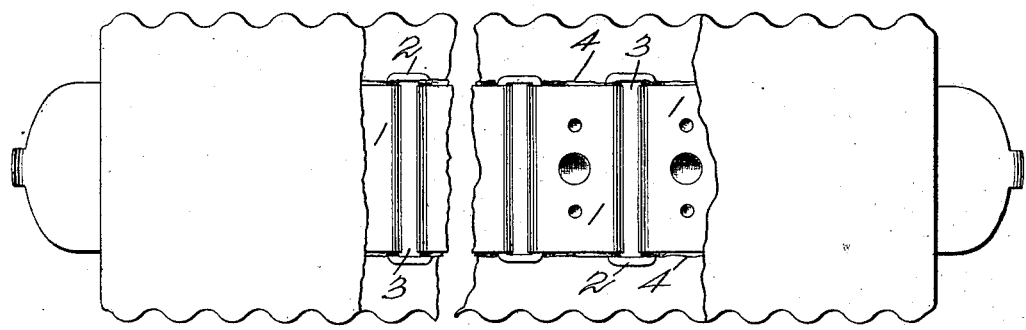
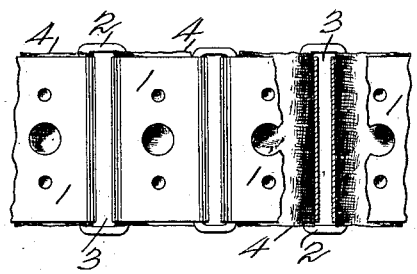
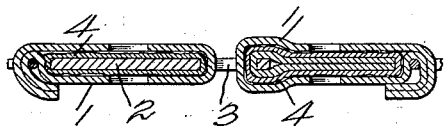
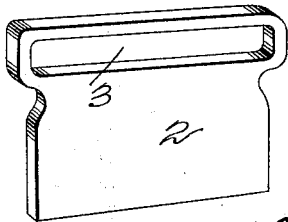
Witnesses
George Hilton
L. Hilton
Inventor
R. Wingren,
By H. B. Wilson
Attorney No. 727,525. Patented May 5, 1903.

UNITED STATES PATENT OFFICE.

RICHARD WINGREN, OF BURLINGTON, KANSAS.

ELECTRIC BATTERY FOR BODY WEAR.

SPECIFICATION forming part of Letters Patent No. 727,525, dated May 5, 1903.

Application filed February 16, 1903. Serial No. 143,561. (No model.)

*To all whom it may concern:*

Be it known that I, RICHARD WINGREN, a citizen of the United States, residing at Burlington, in the county of Coffey and State of Kansas, have invented certain new and useful Improvements in Electric Batteries for Body Wear; and I do declare the following to be a full, clear, and exact description of the invention, such as will enable others skilled in the art to which it appertains to make and use the same.

My invention relates to improvements in electric batteries of the kind worn as belts on the body for therapeutic purposes; and it consists in the peculiar construction and combination of devices hereinafter fully described and claimed.

The object of my invention is to provide an element for a battery of this character, forming a plate adapted to be inclosed in the outer element and having an integral loop at one side thereof through which the outer element is passed and serving for the attachment of the outer element of the next unit or cell in the series, thus simplifying the construction of the units or cells of the battery and rendering the same strong and durable.

In the accompanying drawings, Figure 1 is an elevation of an electric belt for body wear provided with a battery embodying my improvements, a portion of the outer covering or sheath of the belt being broken away to disclose some of the cells or units of the battery. Fig. 2 is a detail elevation of a few of the battery cells or units, some of them being partly broken away to disclose the interior construction. Fig. 3 is a detail sectional view taken on the plane indicated by the line *a a* of Fig. 2. Fig. 4 is a detail perspective view of the interior plate element having the integral loop at one side.

Each alternate cell or unit of the battery comprises an outer element 1, which may be a strap of either copper or zinc, and an inner element 2, forming a plate of suitable size, shape, and material and having formed at one side thereof and integrally therewith a loop 3, which projects from one side thereof and somewhat beyond its ends. The strap 1, constituting the outer element, is passed through the loop 3 and doubled over the inner element 2, as shown, a suitable fabric 4 being placed between them. The said loop also serves for the connection of the outer element of the next cell or unit in the series, as shown.

By the provision of the plate with the integral loop the construction of the electric belt is greatly simplified and strengthened.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. A battery of the class described, having an inflexible plate element formed integrally with a widened loop at one side, and a flexible strap element doubled around said plate, and having its end portions passed through the loop thereof and bent reversely, substantially as described.

2. An element for a battery of the class described, comprising a plate having one end widened to project beyond opposite side edges thereof, said widened end portion having a slot 3 coextensive in width with the plate and forming a loop at one end thereof, substantially as described.

In testimony whereof I have hereunto set my hand in presence of two subscribing witnesses.

RICHARD WINGREN.

Witnesses:
J. H. RUDRAUFF,
WM. H. RUDRAUFF.